Aug. 20, 1957  S. M. SILVER ET AL  2,803,385
AUTOMATIC METERED DISPENSING CONTAINERS
Filed Dec. 20, 1955  5 Sheets-Sheet 5

INVENTORS
Stan M. Silver &
BY Louis Silver

United States Patent Office 2,803,385
Patented Aug. 20, 1957

2,803,385
AUTOMATIC METERED DISPENSING CONTAINERS

Stan M. Silver and Louis Silver, New York, N. Y.; said Louis Silver assignor to Stan M. Silver Application December 20, 1955, Serial No. 554,373

21 Claims. (Cl. 222—456)

The present invention relates to a dispensing container and, more particularly, to a dispensing container for readily flowing solid material such as powdered or granulated solids as granulated or powdered soap or detergents or the like, and has for its object the provision of such dispensing container that is capable of discharging metered amounts of the material at each dispensing use.

Containers which were claimed capable of dispensing metered amounts of material have heretofore been described but, to applicant's knowledge, have never been successfully commercially produced and used. The reason for the failure to use such metered dispensing containers as heretofore described is believed to be the fact that such containers, as heretofore conceived, had not actually been able to discharge uniformly and evenly metered amounts of material on successive uses. This failure may be accounted for by the general fact that such containers have not been able to completely shut off movement of the material into their metering compartments during the dispensing operation, and by the further fact that they were unable to get uniform amounts of material into their metering compartment in the first place.

It is the object of the present invention to provide a metered dispensing container of the character described which will dispense substantially accurately uniform amounts of material at each use, at least within limits of variation, that for all practical purposes are immaterial and of no consequence.

It is another object of the present invention to provide a metered dispensing container of the character described having a metering chamber which will at all times be filled with a substantially uniform amount of material regardless of the amount or level of material within the container itself.

It is also an object of the present invention to provide a metered dispensing container of the character described in which the flow of material into the metering chamber is substantially suspended during the dispensing operation, from the beginning of the tilting of the container for dispensing purposes to the completion of the dispensing operation, so that the amount of material originally in the metering chamber is the amount discharged.

It is still another object of the present invention to provide a metered dispensing container of the character described having an improved discharge nozzle that may be easily and quickly set up by the user and which will discharge the material in a clean and uniform stream and which renders the container substantially proof against inadvertent loss or discharge of material by reason of its being turned over or dropped.

It is yet another object of the present invention to provide a metered dispensing container of the character described which utilizes a minimum of material and makes use of its entire volume.

It is a further object of the present invention to provide a metered dispensing container of the character described which may be pre-formed from a minimum number of parts.

It is a still further object of the present invention to provide a metered dispensing container of the character described which may be easily and simply set up.

It is yet a further object of the present invention to provide a metered dispensing container of the character described which may be shipped flat to the point of setting up and filling and stored flat until setting up and filling.

The foregoing and other objects and advantages of the metered dispensing containers of the present invention will become more readily apparent to those skilled in the art from the several embodiments thereof, in the form of cardboard cartons, shown in the accompanying drawings and from the description following. It is to be understood, however, that such embodiments are shown by way of illustration only, to make the principles and practice of the invention more readily comprehensible and without any intent of limiting the invention to the specific details therein shown.

Generally stated, the present invention involves the principle of providing a receptacle having an outlet opening, or in which an outlet opening may be formed, with a metering chamber which is wholly enclosed along the greater portion of its height and is disposed below the outlet opening and is connected thereto. The invention also involves the principle of providing within the receptacle a separate, wholly enclosed, supply chamber at a level substantially above the metering chamber, and in providing a communicating opening between the metering chamber and the supply compartment so arranged that when the metering chamber is filled from the supply compartment, the opening is blocked by the material and remains blocked while the receptacle is tilted through an angle of at least 90° for effecting the discharge of material from the metering compartment. By this way the amount discharged from the metering compartment at any dispensing operation consists of the original amount fed thereinto from the supply compartment, without any additions flowing into it in the course of the dispensing operation, so that the receptacle dispenses exactly the even amounts at each use.

The foregoing principles may be effectively carried out by providing a metering chamber of a height less than the height of the receptacle and occupying only a portion of the cross-sectional area of the receptacle, closest to the outlet opening, and by making the supply compartment at a level above the metering chamber and partly overlying the same, and providing the communicating opening between the supply compartment and the metering chamber in a common wall portion of the two compartments, preferably in that part of the bottom wall of the supply compartment which also forms the top wall portion of the underlying part of the metering compartment, so that the inlet opening from the supply compartment into the metering chamber is at right angles to the vertical axis of the metering chamber.

In a preferred embodiment of the invention the supply compartment may also be in communication with the remainder of the receptacle volume, by means of a one-way valve in the bottom wall of the supply compartment which permits the utilization of the remainder of the volume of the receptacle as a storage magazine from which the supply compartment may be replenished as its contents are discharged into the metering chamber and dispensed therefrom.

The invention also involves the provision of a chute leading from the metering chamber to the outlet opening of the receptacle which completely blocks the outlet opening from direct communication with the remainder of the interior of the receptacle, and with a nozzle above the outlet opening that is easily and firmly erectable by the user from prepared sections of the receptacle wall immediately surrounding the outlet opening.

Referring now more specifically to the accompanying drawings, and with particular reference to the embodiment of the invention illustrated in Figs. 1 to 9 thereof, wherein the invention is embodied in a rectangular cardboard box or carton, such as conventionally used for soap powder or the like, such carton is formed of two blanks, a cardboard blank for the carton proper, generally designated as 25, and a second blank, which may be of thinner or inferior cardboard, for forming the inner structure of the container, and generally designated as 26.

Figure 1:
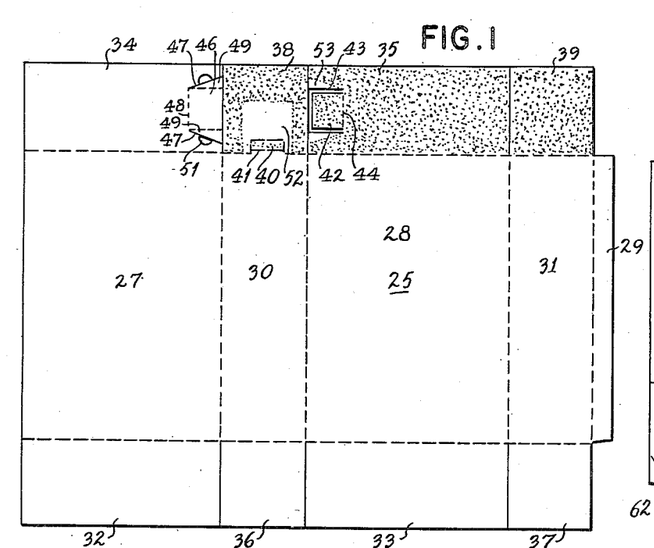
Fig. 1 is a plan view of a cardboard blank forming the exterior of one embodiment of the metered dispensing container of the present invention, with provisions for forming the outlet nozzle thereof.

The blank 25 may be of generally conventional outline and formation including outer and inner side wall forming sections, 27 and 28, respectively, and inner and outer end wall forming sections, 30 and 31, respectively, the latter of which may be provided with a gluing flange, 29. The side wall sections 27 and 28 are each provided with an integral bottom forming flap, 32 and 33, respectively, defined by a separating, conventional scored fold line, indicated by the broken lines, and with an integral top wall forming flap, 34 and 35, respectively, similarly defined. The end wall sections 30 and 31 are also each formed with an integral bottom wall forming flap, 36 and 37, respectively, and with an integral top wall forming flap, 38 and 39, respectively, defined from their respective end walls by conventional fold lines.

In setting up the carton, the bottom thereof may be set up in the conventional way, with the bottom end wall flaps, 36 and 37, disposed internally of the side end wall flaps 32 and 33, and the latter in any desired arrangement. However, in order to provide the improved nozzle of the present invention, the top flaps 34, 35, 38 and 39 must be prepared and arranged in a particular manner which will now be described.

The top end wall flap, 38, is formed with an incompletely struck out rectangular portion, 40, at approximately the center of its junction with the end wall 30, which, when removed, as will hereinafter be explained, forms the carton outlet opening, 41.

The top side wall flap 35 is formed with a rectangular tongue, 42, at its end adjacent the top end wall flap 38, which is defined by struck out side strips and end strip, 43, and is provided with a scored fold line, 44, at its base. The top side wall flap 34 is provided with an outwardly diverging tongue, 46, at its inner end, defined by diverging cut lines, 47, and by a fold line, 48, at its base. Two parallel fold lines divide the tongue 46 into a rectangular central section and into triangular wing sections, 49, at each side thereof. Semi-circular finger cut outs, 51, may be formed in the top wall flap 34 alongside each of the cut lines 47.

To assemble the top closure of the carton, glue is applied to completely cover the top wall flap 39 and to partially cover the top wall 38, leaving an area on the latter inwardly of the opening 41 which is free of glue, as shown at 52. Similarly, glue is applied to the top surface of the side flap 35, except for triangular sections, 53, on each side of the struck out tongue 42, corresponding in shape to the wings 49 of the tongue 46. In closing the carton, the flaps 38 and 39 are first offset towards one another and the flap 35 is disposed over them; the inner surface of the tongue 42 adhesively engaging the cut out 40 but otherwise remaining unattached to the underlying portion of the flap 38 because of the unglued section 52. Thereafter, the flap 34 is folded over and secured to the flap 35; the center rectangular portion of the tongue 46 adhesively engaging the glued surface of the tongue 42 with the wings 49 remaining unattached by reason of the unglued triangular areas 53 to each side of the tongue 42.

In order to form the outlet nozzle, the edges of the tongue 46 are engaged through the finger openings 51 and the wing sections 49 pressed towards one another. This will cause the forward end of the tongue 46 to be elevated and tilted; elevating and tilting the tongue 42 which is adhesively secured to its underside; the latter in turn tearing out rectangle 40, which is adhesively secured to its underside to provide an opening into the receptacle. The edges of the tongue 46 are continued to be pressed toward one another until wings 49 are erected and in register with the struck out strips 43 which form grooves in which the bottom edges of the wings 49 may be engaged and held in place to retain the nozzle in setup position, as clearly seen in Figs. 5 and 9.

It will be apparent that once the blank 25 has its top end forming flaps suitably prepared and suitably adhesively coated and engaged in the proper order, the setup of the nozzle becomes a very simple operation and, that, once set up, the nozzle will remain in setup position and will channel the material dispensed from the container in a smooth, straight and confined stream in a manner that is both convenient and desirable for cleanliness and economy and for ease of directing it to any desired spot or receptacle without spilling over or scattering the dispensed material.

Figure 2:
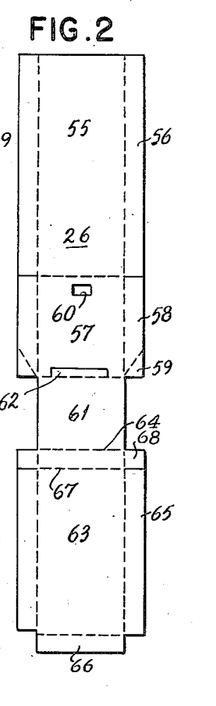
Fig. 2 is a plan view of a unitary die cut blank from which the metering structure of the container of Fig. 1 may be set up within the carton.
Figure 3:
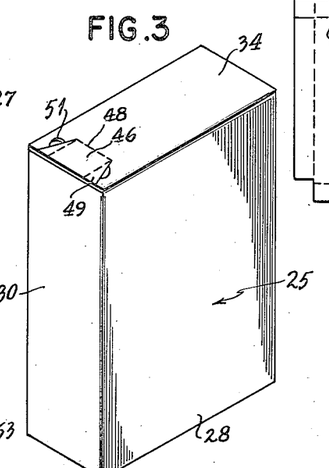
Fig. 3 is a perspective view of the exterior of the carton set up from the blank of Fig. 1.

To provide the metering chamber, the chute and the supply compartment within a carton such as described above, I utilize the one piece cardboard blank 26 which is subdivided, by suitably located scored fold lines, into a number of sections including a chute defining section, 55, formed with lateral gluing tabs, 56, separated therefrom by scored fold lines, a metering chamber wall section, 57, continuous with the bottom edge of the chute portion 55 and defined therefrom by a scored fold line and having lateral gluing tabs, 58, which are severed from the gluing tabs 56 and having their outer corners, 59, furthest from the tabs 56, foldable relative thereto by means of suitable scored fold lines. The section 57 is provided with a rectangular opening, 60, at a central point thereof, closely adjacent its junction with the chute section 55 to provide an opening into the metering chamber.

The blank section 57 has continuous with its other end a connecting section, 61, which is defined therefrom by a suitably scored fold line and is formed with a struck out tongue, 62, forming a gluing tab which extends into the section 57. The section 61 has, coextensive with it at its other end, a section, 63, which is adapted to form the bottom of the supply compartment and is separated from the connecting section 61 by a fold line, 64. The blank section 63 is provided with gluing tabs, 65, along its side edges and with a gluing tab, 66, at its bottom edge. If desired, a fold line, 67, may be provided in slightly spaced relation to the fold line 64, which fold line 67 extends as a cut line into each of the glue tabs 65, to form separate corner gluing tabs, 68.

Figure 4:
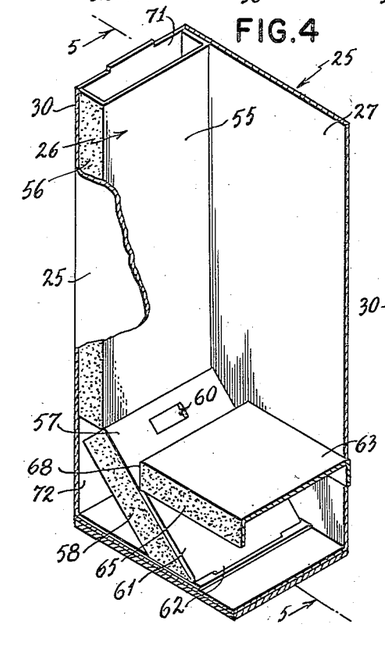
Fig. 4 is an enlarged, fragmentary, partly sectional view of the carton set up from the blanks of Figs. 1 and 2.
Figure 5:
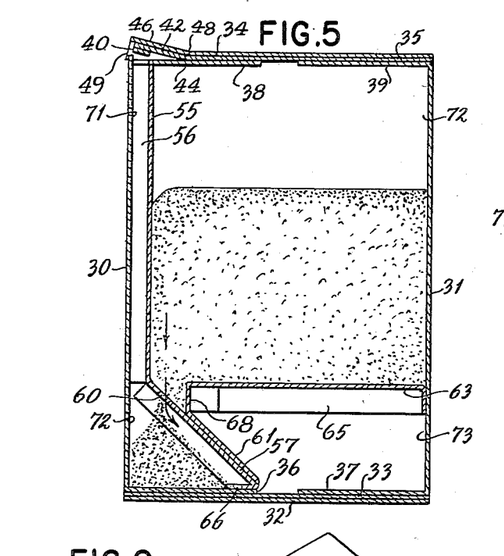
Fig. 5 is a section taken on line 5—5 of Fig. 4; showing the metering chamber in the process of being filled.

In assembling the blank 26 with the carton, the chute forming section 55 thereof is disposed vertically within the carton parallel to the end wall 30 thereof, with its tabs secured to the side walls 27 and 28 in position that the chute space, 71, underlies the opening 41. The section 57 of the blank 26 is disposed diagonally above the bottom corner of the carton, below the opening 41, its tabs 58 adhesively engaging the side walls 27 and 28, and its corner tab portions 59 engaging the bottom wall of the container. The connecting section 61 is reentrantly bent over the section 57, terminating short of the opening 60, its tongue 62 adhesively engaging the bottom of the container. The part of the section 63 between the fold lines 64 and 67 is disposed in erect position, and the remainder thereof is disposed in horizontal position to provide the bottom wall for the supply compartment, 72, and leaving a dead space, 73, below it.

It will be apparent that by disposing the section 57 of the blank 26 at an angle across the bottom corner of the carton below the chute 71, a metering chamber of triangular shape is provided; a shape that is adapted to substantially conform to the shape assumed by a mound of material such as would be formed by the material entering thereinto through the opening 60, to provide a minimum amount of dead space that could possibly be filled by the undue shaking of the container. This will assure that the metering chamber will contain an equal amount of material every time it is normally filled after having its contents discharged. This will be clearly seen from Fig. 5 of the drawing.

Figure 6:
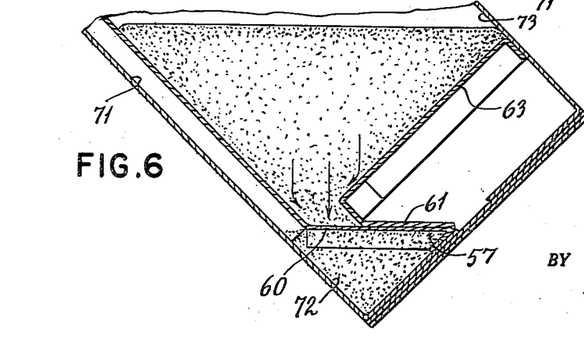
Fig. 6 is a fragmentary, sectional view similar to Fig. 5, showing the metering chamber substantially completely filled and the carton tilted at approximately 45°, in the initial dispensing movement with the inlet opening into the metering chamber blocked by the material from within and without thereof.
Figure 7:
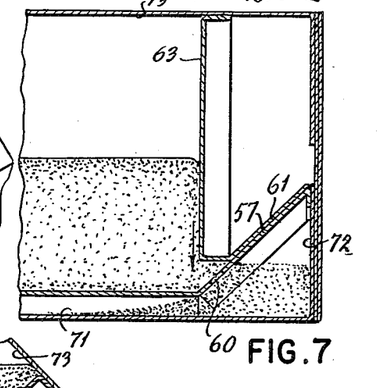
Fig. 7 is a view similar to Fig. 6, showing a next step in the dispensing movement; the carton being at the horizontal and the metering chamber commencing to empty while its inlet is still blocked for movement of material therethrough.
Figure 8:
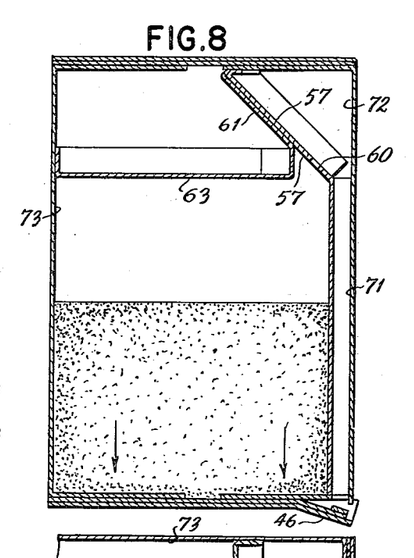
Fig. 8 is a view similar to that of Fig. 5 with the carton in completely inverted position, at the end of the dispensing movement, with the metering chamber completely discharged, without any afterflow.
Figure 9:
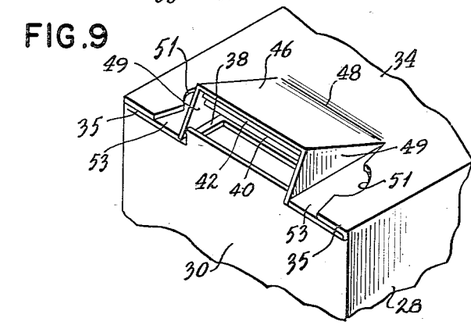
Fig. 9 is a fragmentary, perspective view of the outlet end of the carton showing the discharge nozzle as set up over the outlet opening of the carton.

After the metering chamber 70 is completely filled, the opening 60 is blocked by the material within the chamber and the material within the supply compartment 72, so as to prevent any substantial interchange of material between the metering chamber and the supply compartment, and that such condition will prevail during the initial tilting of the container for dispensing purposes, as shown in Fig. 6, wherein the container is at an angle of 45° to the horizontal, and during later stages, as shown in Fig. 7, wherein the carton is parallel to the horizontal and the material from the metering chamber is partly discharged into the chute 71. Fig. 8 shows the carton completely inverted, with the metering chamber completely emptied, at which time the contents of the supply compartment do not impinge at all upon the metering chamber opening.

In assembling the carton of Figs. 1–9, of the present invention, the blank 26 forming the chute 71, metering chamber 70, and bottom 63 of the supply compartment 72, is to be set into place within the carton after the latter has been set up in readiness for filling, with one end open, but before the filling operation.

In Figs. 10 to 19, inclusive, we have shown an embodiment of the invention in which the entire carton, including metering chamber and supply compartment, but excluding the chute, may be formed from a single square section of cardboard, in integral form, as illustrated by the blank, generally designated as 80, portions of which may be folded in, as the carton is set up, to define the metering chamber, 81, and the supply compartment, 82.

Figures 10, 11, 12:
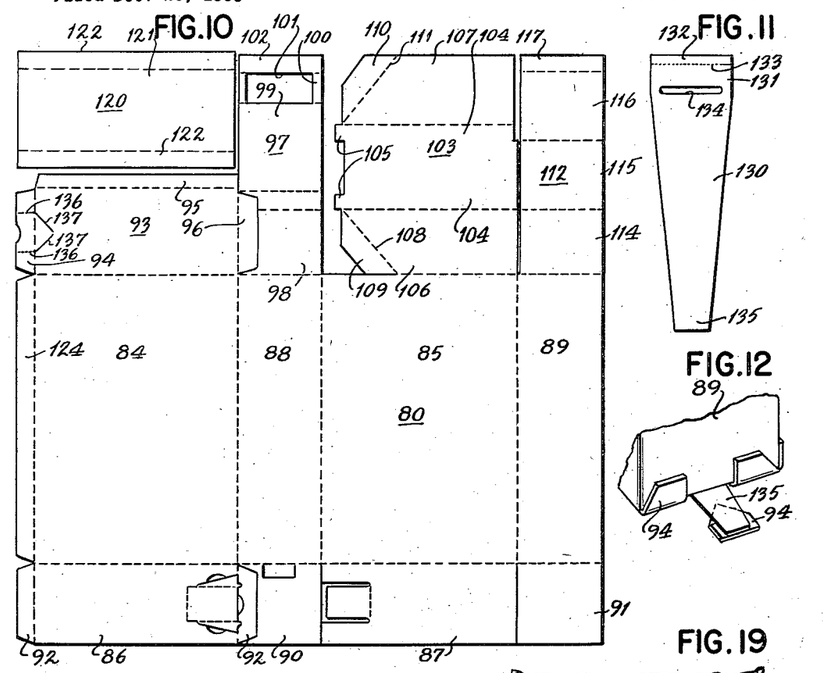
Fig. 10 is a plan view of a one-piece blank for forming a modified embodiment of the invention.
Fig. 11 is a plan view of a movable tab for initially closing off the metering chamber from the chute to which it empties.
Fig. 12 is a fragmentary perspective detail for the tab engaging means.

The blank 80 may have its outer and inner side walls, 84 and 85, respectively, and their respective top wall forming 86 and 87, and its inner and outer end walls, 88 and 89, respectively, and their respective top wall flaps, 90 and 91, substantially similar to the corresponding parts of the blank 25 forming the carton embodiment of Figs. 1–9; except that the top wall flap 86 of the side wall 84 may be provided with gluing tabs, 92, at each of its free edges; with the tab 92 at its inner edge being struck out from a portion of the adjacent flap 90, of the inner end wall 88. The blank 80 is, however, provided with a modified carton bottom forming construction as follows:

The outer side wall 84 is formed with a bottom forming flap extension, 93, of a height and width equal to the width and thickness of the carton and may be formed with gluing tabs, 94, 95 and 96, on its three free edges; tab 96, at its edge adjacent the inner end wall 88, being struck out from the inner end wall bottom extension, generally designated as 97.

The inner end wall bottom extension 97 may be of a height to project beyond the flap 93 and may be divided by scored fold lines into an inner portion, 98, adapted to form the bottom of the metering chamber 81, a second section, 99, adapted to form the inner wall of the metering chamber, a third section, 100, preferably shorter than the section 98, adapted to form a top wall for the metering chamber and having the struck out opening, 101, and an end section, 102, adapted to form a gluing tab for engaging against the inner face of the inner end wall, to set up the metering chamber.

The inner side wall 85 is provided with a bottom extension, generally designated as 103, substantially coextensive in height with the extension 97, but of lesser width than the side wall 85, so as to leave a gap between it and the extension 97. The extension 103 is divided, by scored fold lines into three sections parallel to the side wall 85; a central section, 104, of a height equal to the inner thickness of the carton and adapted to form the bottom wall of the supply compartment 82, and having lug extensions, 105, at each corner of its foreshortened end adapted to rest upon the top wall 98 of the metering chamber, when in set up form; and inner and outer sections, 106 and 107, respectively, at least the inner one and preferably both being of a height equal to the height of the metering chamber 81, when set up, and adapted to support the center section 104, when they are inwardly folded, at the proper level within the set up carton.

The inner section 106 of the extension 103 may be partially cut away from the side wall 85 at the foreshortened end of such extension, and a diagonal fold line, 108, may be formed from the base of such cut to the outermost point of junction of section 106 with section 104, at the foreshortened end, to provide a foldable tab, 109, adapted to abut the inner wall 99, of the metering chamber and to be glued thereto for support purposes, if desired. A corresponding foldable flap, 110, may be formed in the section 107, by the scored fold line, 111.

The outer end wall 89 is formed with a bottom extension, generally designated as 112, which is subdivided by scored fold lines into an inner section, 114, a center section, 115, of a height equal to the height of the metering chamber, when set up, an end section equal in height to the inner section 114, and an end gluing tab 117; such extension 112 being foldable along the fold lines to have the section 114 lie on the bottom wall of the carton formed by the flap 93, the center section 115 being erected to support the bottom wall 98 of the supply compartment together wtih the horizontally disposed outer section 116 which is folded to underlie the wall 98, when the gluing tab is adhesively secured to the inner face of the outer end wall 89.

The chute forming blank, generally designated as 120, for the carton embodiment of Figs. 10 to 19, may be cut out from the same cardboard square from which the blank 80 is struck out, from the corner formed by the flap 93 and extension 97, as clearly shown in Fig. 10, to attain maximum economy of material, and at the same time as the blank 80, for economy of tooling and production. Such blank 120, may comprise the chute wall forming center portion, 121, and the gluing tabs, 122, at the sides thereof.

Figures 13, 14, 15, 16, 17:
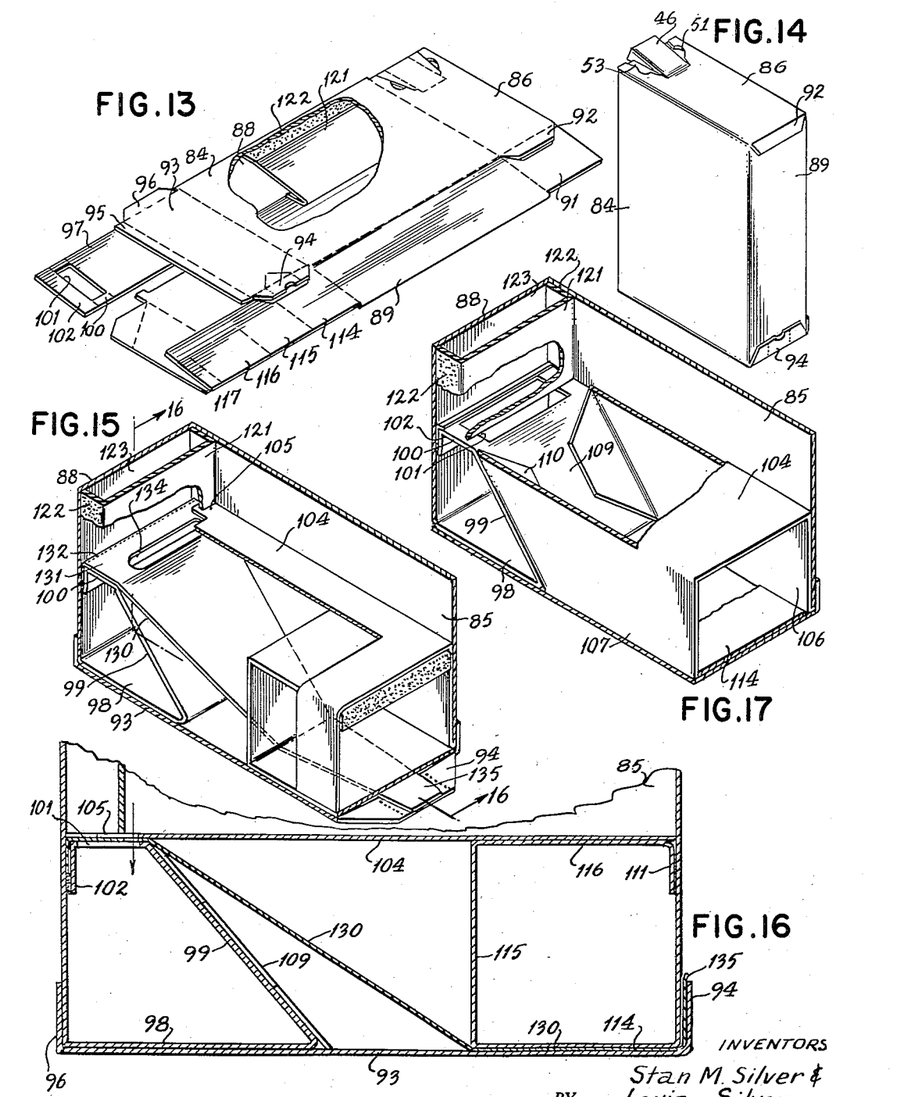
Fig. 13 is a plan view of the blank of Fig. 10, shown as folded for shipping but not set up, with the inner chute and the tab of Fig. 11 in place in chute closing position.
Fig. 14 is a perspective of the carton set up from the folded blank of Fig. 13.
Fig. 15 is a fragmentary, perspective, partly sectional and partly broken away view of the lower portion of the container of Fig. 14, showing the tab of Fig. 11 in position.
Fig. 16 is a vertical, sectional view taken on line 16—16 of Fig. 15.
Fig. 17 is a view similar to that of Fig. 15, with the tab of Fig. 11 removed.

In a preassembly stage, the blank 120 may be glued in place to the two side walls 84 and 85, adjacent the inner end wall 88, of the blank 80, by its gluing tabs 122, to form the chute 123. Thereafter, the gluing tab, 124, of the outer side wall 84 is glued to the outer edge of the outer end wall 89. In this state, the blank 80 may be folded and shipped to the point of filling, in flat state, where it may be kept flat until ready for completing the setting up and filling.

When it is desired to complete the setting up of the carton of Figs. 10 to 19, for filling, the top side and end wall flaps, 86, 87, 90 and 91, are suitably folded over one another and adhesively secured to one another to cover or close the top of the carton, in the manner described with respect to the embodiment of Figs. 1 to 9, especially if a nozzle structure similar to that of Figs. 1 to 9 is provided, as illustrated. The carton is then inverted and filled from its bottom to the desired level, including, if desired the space of the chute 123.

Figure 18:
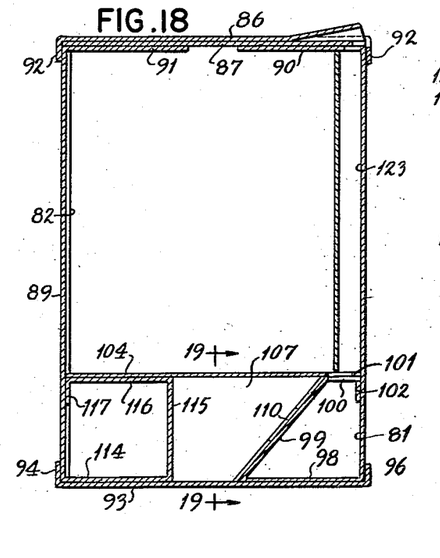
Fig. 18 is a vertical, sectional view of the whole carton in the position of Fig. 17.
Figure 19:
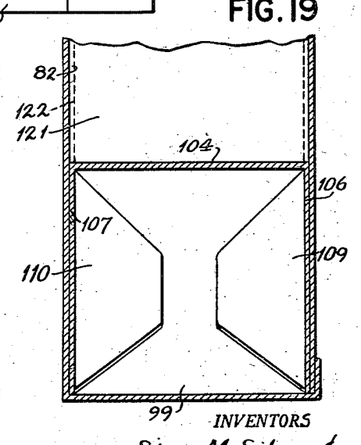
Fig. 19 is a fragmentary, sectional view taken on line 19—19 of Fig. 18.

After the carton is filled, the inner side wall extension 103 is inwardly folded, into the carton, until the inner section 106 thereof is disposed against the contiguous portion of the inner side wall, the center section 104 thereof is horizontally disposed and the outer end section 107 thereof is disposed against the inner face of the outer side wall 84; so that such intermediate section 104 forms the bottom wall of the supply compartment 82, its lugs 105, partly underlying the bottom edge of the chute 123 and the space between such lugs extending inwardly from the chute wall 121 providing an opening, 126, for communication between the supply compartment 82 and the space below the wall 104 thereof. After the extension 103 is infolded, its diagonal tabs, 109 and 110 are offset toward one another.

Thereafter, the extension 97 of the inner end wall 88 is inwardly folded into the carton, with inner section, 98 and its outer section 100 both disposed parallel to one another to form the top and bottom of the metering chamber and its center section 99 forming the inner wall thereof, the gluing tab 102 being dependently adhesively secured to the inner surface of the end wall 88, to maintain the metering chamber in position. In this position, the top wall 100 of the metering chamber will underlie the chute 123 and the tabs 105 of the extension 103, and the opening 101 will partly underlie the chute 123 and the openings 126 between the tabs 105, to serve in the double capacity of having one portion forming an inlet from the supply compartment 82 into the metering chamber 81 and its other portion forming an outlet from the metering chamber into the chute.

After the extensions 97 and 103 are duly folded into the carton, the bottom extension 112 of the outer end wall 89 is folded inwardly to support the wall 104 of the supply compartment and generally to strengthen the bottom of the carton, in the manner described above. The flap 93 of the outer side wall 84 is folded over the bottom of the carton and its gluing tabs 94, 95 and 96 glued to the bottom portions of the appropriate side and end walls, to seal the carton.

It will be apparent that the carton of Figs. 10 to 19, as thus far described, forms a metering carton substantially identical in final structure and in the manner in which it operates to dispense its contents, with the carton of Figs. 1 to 9; except that the metering chamber is formed with a top wall and the inlet opening thereinto is formed in such top wall instead of in the upper portion of the slope of the inner wall thereof.

While the embodiment of Figs. 1 to 9 will meter to dicharge uniform amounts each time except the first time, due to the fact that a quantity of material may have gradually entered the chute of the device because of severe shaking during transportation and handling in the stores, the embodiment of Figs. 10 to 19, may be formed to discharge an even metered amount even on the first use. This may be done by making the volume of the chute equal to the volume of the metering chamber and filling the chute completely at the time of filling the carton, and by providing a temporary bottom closure for the chute that may be removed after the contents of the chute are discharged in the first dispensing use of the carton, to open the chute to the metering chamber for successive dispensing from the metering chamber. Such temporary closure, obviously, would prevent any variation in the volume of the chute until after it is emptied.

Such closure may comprise a strip of thin material such as paper, 130, as shown in Fig. 11, which may have a rectangular end portion 131, of a width equal to the thickness of the carton and may have an end portion 132, defined from the portion 131 by a tear line, as of perforations 133. The blank 130 may be secured to the end wall 88 by its end portion 132, directly below the chute 123; the rectangular portion 131 underlying the chute 123 to close its bottom end and having a slot 134, extending transversely thereof in position to register, when the strip is in such position, with the opening 126 between lugs 105, to provide clearance between the supply compartment 82 and the inlet opening portion of the chamber 81. The blank 130 may extend inwardly into the dead space of the carton below the wall 104 of the supply compartment and diagonally thereacross and pass under the section 114 of the end wall extension 112 to the exterior of the carton where its projecting end 135, may be engaged under the glue tab 94. The latter may be scored for tearing along the edges of the strip end 135, as at 136, and converging cut lines 137, may be provided from the base of the tear lines 136.

In order to free the communication between the chute 123 and the metering chamber 81, after the first dispensing, the portion of the glue tab 94 between tear lines 136, is torn away, as shown in Fig. 12, this frees the torn away piece along the cut lines 137, for pulling away from the carton and thereby tearing the strip 130 along the tear line 133, and pulling it away from its position over the top wall 100 of the metering chamber 81, leaving both its inlet and outlet openings free and unobstructed.

In actual production, the closure strip 130 may be secured in place by its end portion 132 at about the same time as the chute blank 120 and constitute part of the semi-assembled carton that is shipped flat to the point of setting up, filling and sealing.

Figure 20:
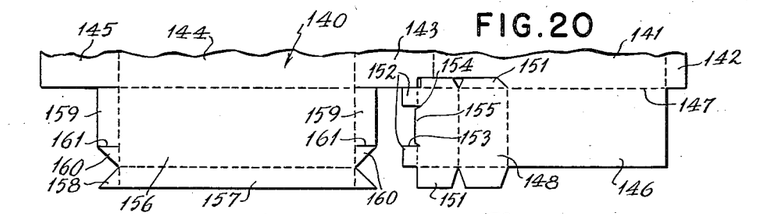
Fig. 20 is a fragmentary plan view of the end of a blank that forms the metering end of the outer structure of a further modified form of the carton of the invention that enables the utilization of the space below the false bottom or platform.
Figures 21, 22, 23:
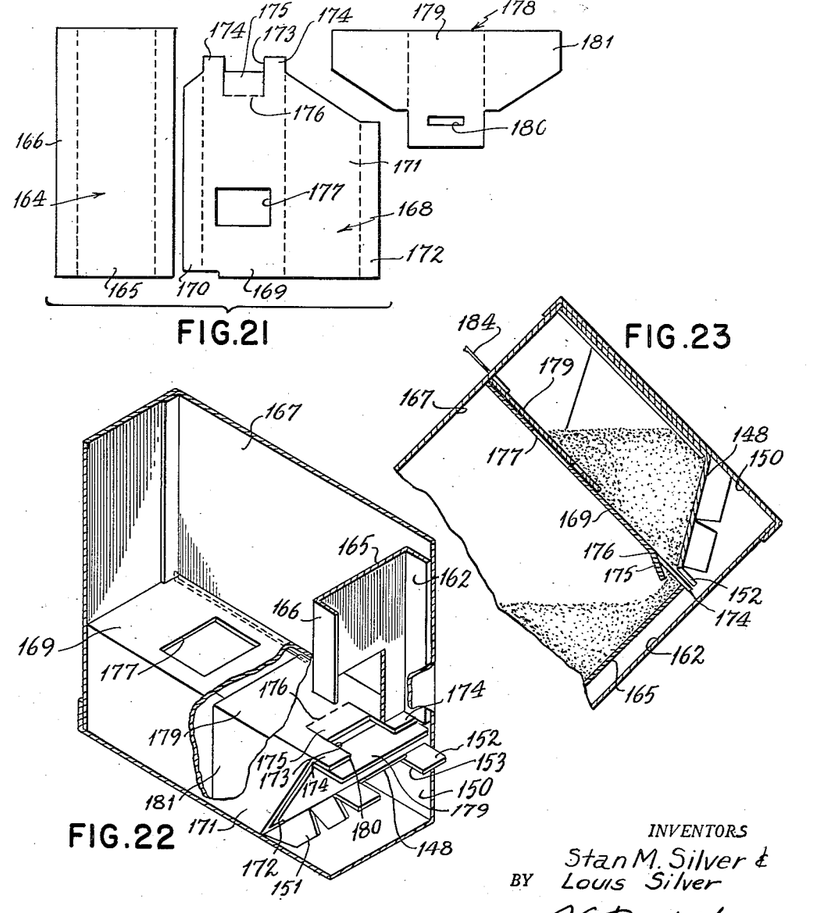
Fig. 21 is a plan view of the several parts forming the inner discharge end assembly of the carton.
Fig. 22 is a fragmentary, sectional view, partly in elevation and partly broken away, of the lower portion of the carton formed by the blank of Fig. 20.
Fig. 23 is a fragmentary, vertical, sectional view through the carton end of Fig. 22, showing the same in position emptying the space below the false bottom in the main body of the carton.

A characteristic common to both of the metered dispensing cartons described above is the dead space remaining within the cartons below the bottom of the supply compartment. This wasted space detracts from the economy in carton material and in storage and shipping space that may be critical considerations in their use for certain purposes. In Figs. 20 to 22, we have, therefore, illustrated an embodiment of a metered dispensing carton which both, yields uniformly accurate metered amounts of material at all dispensing uses and also utilizes the entire cubic content of the carton for storing the material to be dispensed, including the space below the supply compartment, to thereby attain maximum possible economy in the consumption of carton forming material that can be attained with metered dispensing cartons and a space economy substantially equal to that of the conventional, non-metered carton.

Fig. 20 illustrates the bottom fragment of a carton forming blank 140, including an outer side wall section 141, having a gluing tab 142, along its outer edge; an inner end wall section 143; an inner side wall section 144, and an outer end wall section 145. The outer side wall section 141 is provided with a bottom flap extension 146, which is connected along part of its width to the lower edge of section 141, as along fold line 147, and whose inner end portion 148, is severed from such side wall 141 and extends past it to underlie part of the adjacent inner end wall section 143. The flap portion 147 is adapted to form the inner wall of the metering chamber 150, as shown in Figs. 22 and 23, and is provided with a gluing tab or tabs 151 along its inner and outer edges; the gluing tab along its inner edge being struck out from a portion of the outer side wall 141 and of the adjacent inner end wall section 143. The flap portion 147 is also provided at its end edge with corner lugs 152, projecting outwardly therefrom, forming a space 153, between them to serve, in part, as a passageway into the metering chamber 150; the lugs constituting the top wall thereof. Notches 154, may be formed at the base of the lugs 152, to provide a relatively narrow tongue portion 155, between them.

The inner side wall section 144 is provided with a bottom flap, 156, coextensive with its width and adapted to form the bottom of the carton as well as of the metering chamber 150. The flap 156 is formed with a gluing tab 157 coextensive with its outer edge and having, preferably, triangular projections, 158, at each end whose outer edge is coextensive with the outer edge of the flap 156, and are foldable relative thereto along fold lines at their base that are perpendicular to the outer edge of the flap 156.

The flap 156 is also provided with gluing tab extensions, 159, at each end edge, each of which underlies an adjacent end wall section and each having its outer corner cut away, to leave a triangular tab portion, 160, which is severed from the body of the tab proper by a cut line, 161.

The carton of the embodiment illustrated in Figs. 20–23 is also provided with a chute, 162, formed from a blank, 164, having the center or wall portion, 165 and the gluing tabs, 166.

The supply compartment 167 of the embodiment of Figs. 20 and 23 is formed from a separate blank, generally designated at 168, which comprises a bottom portion, 169, for forming the bottom wall of the supply compartment, and may have a gluing tab, 170, along one edge, terminating short of the discharge end of the wall portion 169 and a support extension, 171, along its other edge, also terminating short of the discharge end of the wall portion 169, and of a height equal to the height of the metering chamber 150; such support portion being formed with a gluing tab, 172, along its side edge. The section 169 of blank 165 is formed with a cut out space, 173, at its discharge end adapted to form a communicating passageway between the supply compartment 167 and the metering chamber 150, when the wall section 169 is in place, and leaving lugs, 174, at each side thereof adapted to underlie the chute 162. A valve tongue, 175, is cut away along its sides from the wall section 169, rearwardly of the cut out space 173 and is provided with a fold line, 176, at its base which permits it solely to fold inwardly into the supply compartment 167. The wall section 169 of blank 168 is also provided with a central cut out opening, 177, whose purpose will hereinafter be defined.

The carton of embodiments 20 to 23 is provided with an additional blank, 178, having a central portion, 179, of a width equal approximately to the width of the wall section 169 of blank 168, provided with a transverse slot, 180, at a distance from one end and dependent supporting flaps, 181, at each side, substantially equal in height to the supporting flap 177 of blank 168 and extending from a point inwardly of the slot 180 to the other edge of the central section.

In assembling the carton, the chute 162 is first formed by gluing blank 164 in place. The side and end wall sections are then suitably folded and secured in place to form the body of the carton. Thereafter the blank 168 is inserted from the underside of the carton, with its dependent support 177 flush with the bottom edge of the container to thereby position the wall section 169 at the appropriate level, and the blank 168 is secured in place in such position with its lugs 174 partly underlying the chute 162 and its other end flush against the opposed end wall of the carton by its tab 170.

Thereafter, the blank 178 is inserted with its section 179 underlying the wall section 169 of blank 168 and its supporting flaps 181 dependently disposed and its slot 180 underlying the space 173 between lugs 174, and the section forwardly of the slot 180 underlying the chute 162, closing the same from the bottom. Thereafter, the flap 146 may be folded across the bottom opening of the carton and the section 147 thereof upwardly diagonally offset and its lugs 152 horizontally offset to underlie the lugs 174 of the blank 168, so that the space 153 between the lugs 172 is in register with the space 173 between the lugs 174, and in this position the flap portion 147 is adhesively secured in place by the gluing tabs 151.

The bottom of the carton is then sealed by folding over the flap 156 and securing its several tabs in place against the outer surface of the appropriate side and end walls of the carton. The carton is then filled from the top including the space 183 below the supply compartment 167 which is filled through the opening 177 in the wall 169; the chute 162 and the metering chamber 150, which is filled through the inlet opening provided by the registering spaces 153 and 173 and the slot 180. The carton is then sealed at the top in the manner described above.

In use, the first dispensing will be of the material within the chute; any other material being prevented from entering the same by the portion of the blank 178 that underlies the chute. After the first dispensing, the blank 178, which, as it will be apparent, is freely and movably disposed within the space 183, may be moved out of its position by means of a string, 184, or other suitable element that is connected thereto and passes through a suitable opening to the exterior of the carton, as shown in Fig. 23, to simultaneously open the bottom of the chute 162 and block the opening 177.

On the next dispensing movement, the metering chamber 150 will be emptied into the chute and dispensed therefrom, simultaneously the valve tongue 175 will be bent under the weight of material within the storage compartment 183 to form an opening through which the material in the storage compartment 183 flows into the supply compartment 167. After this second dispensing movement, and when the carton is again upended, the valve tongue 175 will fall back again into place to close the storage compartment against the movement of material back thereinto, at the same time the metering chamber 150 will be refilled from the supply compartment 167. This dispensing operation can be repeated until the storage compartment and then supply compartment are completely emptied.

It may here be stated that the valve tongue 175, instead of being integral with the supply compartment wall 169, may, if desired, be formed of a stiffly flexible section of paper that is appropriately glued in place over the struck out area that may be produced by the complete removal of the tongue 175; such paper valve being secured to the upper surface of the wall 169 and overlying the edges of the opening covered thereby, in a manner readily understood and not thought necessary to be here shown.

While the metered dispensing container of the present invention has been illustrated as embodied in cardboard cartons of rectilinear shape, it will be quite apparent that the present invention may be readily adapted for use with containers of other shapes, as round or oval or even irregular, and may be made of other materials, such as sheet metal, glass or plastic.

This completes the description of the metered dispensing containers of the present invention. It will be readily apparent that such containers will dispense accurately and uniformly metered amounts at each dispensing use, from the first to the last. It will also be apparent that the metered dispensing containers of the present invention are simple and easy to use and may be so used by anyone in a substantially foolproof manner and without the need for acquiring any skills therefor.

It will be likewise apparent that the metered dispensing containers of the present invention may be formed with relatively great economy in the container forming material and with great economy in useful volume, and, therefore, storage and shipping space, and that it may be relatively easily and simply set up, filled and sealed.

It will be further apparent that numerous variations and modifications may be made in the metered dispensing cartons of the present invention by anyone skilled in the art, in accordance with the principles of the invention hereinabove set forth and without the exercise of any inventive ingenuity. We desire, therefore, to be protected for any and all such variations and modifications that may be made within the spirit of the present invention and the scope of the claims hereto appended.

What we claim is:

1. A metered dispensing container, comprising a receptacle having a discharge opening formed in an upper portion thereof, a metering chamber including a bottom and side walls formed within said container below said discharge opening, means connecting the interior of said chamber with said discharge opening including an outlet opening in said chamber of reduced dimensions relative to said chamber, a supply compartment formed within said receptacle, said supply compartment including a bottom wall portion substantially at a level with the upper end of said chamber and a communicating opening between said supply compartment and said metering chamber, closely adjacent said outlet opening, at approximately the level of said bottom wall.

2. A metered dispensing container, comprising a receptacle having a discharge opening formed therein in an upper portion thereof, a metering chamber formed in said receptacle, said metering chamber including a bottom and side walls and extending a portion of the height of said receptacle and a portion of its cross-sectional area below said discharge opening, means connecting the interior of said chamber with said discharge opening including a chute and an outlet opening of reduced dimensions provided in said chamber leading to said chute, a supply compartment formed in said receptacle, said supply compartment including a bottom wall portion terminating at said chamber at substantially the level of the upper end thereof, and inlet opening formed in said chamber at substantially the level of said bottom wall of said compartment, closely adjacent said outlet opening and arranged to have material from said compartment directed by said bottom wall thereof into said inlet opening.

3. The metered container of claim 2, wherein said inlet opening is formed in a side wall of said metering chamber at substantially the upper end thereof.

4. The metered dispensing container of claim 2, wherein said metering chamber has its bottom wall and portions of its side wall in common with said container and a portion of its side wall separate from said container.

5. The metered dispensing container of claim 2, wherein said metering chamber is formed in a lower corner of said container and has its outer side wall portions in common with said container and its inner side wall portion separate from said container walls.

6. A metered dispensing container comprising a receptacle having top and bottom walls and an upright wall section connecting said top and bottom walls, a discharge opening formed in said top wall at the edge thereof, a metering chamber formed within said receptacle below said discharge opening in a corner of said receptacle, said metering chamber having a bottom and upright walls, said metering chamber having a reduced outlet opening at its upper end, chute means connecting said outlet opening with said discharge opening, a supply compartment within said receptacle, at a level substantially above said metering chamber, and an inlet opening of reduced dimensions provided for said chamber adjacent the outlet opening thereof and communicating with the interior of said supply compartment.

7. The metered dispensing container of claim 6, wherein said metering chamber extends a portion of the height of the receptacle below said discharge opening and a portion of the cross sectional area thereof.

8. A metered dispensing container comprising a receptacle having top and bottom wall sections and an upright wall section connecting said top and bottom wall sections, a discharge opening in said top wall at its junction with the upright wall, a metering chamber formed within said receptacle below said discharge opening, said metering chamber extending a portion of the height of said receptacle and a portion of the cross sectional area, said metering chamber having its bottom and a portion of its upright walls formed by the bottom and upright wall sections of said receptacle and the remaining portion of its upright wall formed by a partition disposed within said receptacle, said metering chamber having a restricted outlet opening at its upper end, a chute connecting said outlet opening with said discharge opening, said metering chamber having an inlet opening formed therein adjacent said outlet opening, and partition means within said receptacle forming a supply compartment at a level above said metering chamber, said inlet opening communicating with the interior of said supply compartment.

9. The metered dispensing container of claim 8, wherein said partition means includes a portion forming a bottom wall having an end terminating at the upper end of said metering chamber, and wherein said bottom wall portion is formed with an opening therein and valve means are provided in said opening for permitting flow of material into said supply chamber from below thereof.

10. A metered dispensing container comprising a receptacle having top and bottom wall sections and a connecting upright wall section, a discharge opening formed in said top wall section substantially at its junction with said upright wall section, a metering chamber formed within said receptacle below said discharge opening, said metering chamber extending a portion of the height of said receptacle and a portion of the cross sectional area thereof, said metering chamber disposed against said upright wall section below said discharge opening and having an outlet opening substantially vertically aligned with said discharge opening, a supply compartment formed in said receptacle at a level substantially above said metering chamber, said chamber and said compartment having a restricted communicating passageway between them, said passageway formed at substantially the upper end of said chamber inwardly of said outlet opening thereof and in position where material flowing from said chamber through said outlet will flow in a direction at an angle to the plane of said passageway.

11. The metered dispensing receptacle of claim 10, wherein said inlet opening and said outlet opening are formed in substantially the same plane.

12. The receptacle of claim 10, wherein said supply compartment includes a bottom wall extending between portions of said upright wall sections and engaging said metering chamber at the upper end thereof, and wherein said bottom wall is formed with an opening adjacent said metering chamber, said opening provided with valve means for permitting a flow of material from the portion of the receptacle exteriorly of said supply compartment and said metering chamber into said supply compartment.

13. A metered dispensing container comprising a receptacle having top and bottom walls and a connecting upright wall, a discharge opening formed in said top wall at its junction with said upright wall, a metering chamber formed within said container below said discharge opening at a bottom corner thereof and extending a portion of the height of said receptacle and a portion of its cross sectional area, said metering chamber having an opening at its top, a chute leading from said discharge opening to said metering chamber, said chute including an upright wall portion having a lower edge extending a cross said chamber opening to define a portion thereof into an outlet opening into said chute, a supply compartment formed within said receptacle, said supply compartment including a bottom wall portion substantially level with the opening in said metering chamber, the other portion of said metering chamber opening defined by said chute wall communicating with said supply compartment, said connecting upright wall having a plurality of bottom extensions, one of said extensions foldable laterally to form the bottom of said metering chamber and upwardly to form an inner upright wall thereof, another of said extensions foldable reentrantly inwardly and then laterally to form the bottom wall of said supply compartment, the reentrantly inwardly foldable portion of said second extension being of a height substantially equal to the height of said metering chamber.

14. A metered dispensing container comprising a receptacle of substantially rectangular cross section, including side walls, end walls, and top and bottom walls, said receptacle having a discharge opening formed therein at the intersection of said top wall with one of said end walls and having a chute substantially the width of said end wall disposed against said end wall and extending from said top wall partly the height of said end wall, a partition in the lower portion of said receptacle extending upwardly from the bottom wall thereof intermediate said side walls to substantially the lower end of said chute, said partition having an extension offset laterally in the direction of said end wall, said extension having a portion cut out therefrom partly underlying said chute and partly disposed inwardly of said chute, a second partition within said container, said second partition extending between said side walls and dividing the space within said container into an upper and a lower portion, said partition having at least a portion thereof horizontally disposed and extending to said upright partition at substantially its upper end.

15. The receptacle of claim 14, wherein said bottom wall comprises a plurality of flaps extending from said side and end walls and wherein said first partition is integral with one of said flaps.

16. The receptacle of claim 14, wherein said bottom wall comprises a plurality of flaps extending from said side and end walls and wherein said first partition is integral with an end wall flap of said container.

17. The receptacle of claim 14, wherein said bottom wall comprises flap extensions of said side and end walls, and wherein said upright partition comprises an integral extension of one of said end wall flaps, and wherein said second partition comprises an integral extension of another of said side wall flaps.

18. The receptacle of claim 14, wherein said bottom wall comprises flap extensions of said side and end walls, and wherein said upright partition comprises an integral extension of one of said end wall flaps, and wherein said second partition comprises an intergral extension of one of said side wall flaps.

19. The receptacle of claim 14, wherein said horizontal portion of said second partition is formed with an opening and means are provided at said opening for limiting the movement of material between the two compartments formed by said partition from the lower of said compartments into the upper one thereof.

20. The receptacle of claim 14, wherein movable means engageable from the exterior of the container are provided intermediate said chute and the chamber defined by said upright partition for closing the opening between said chamber and said chute.

21. A metered dispensing container comprising a receptacle having top and bottom walls and a connecting upright wall, said receptacle having a discharge opening formed in the top wall thereof at a junction with said upright wall, and a metering chamber formed therewithin below said discharge opening, said metering chamber extending a portion of the height of the said receptacle and a portion of the cross section thereof, and having an outlet opening provided at the top thereof, a chute connecting said outlet opening with said discharge opening, a supply compartment formed within said receptacle at a level above said discharge opening, said supply compartment and said metering chamber having a restricted communicating passageway formed between them adjacent said outlet opening and to the other side of said chute therefrom, said top wall comprising a plurality of ply of material arranged in superposed relation across the top of said receptacle, the innermost of said ply having an opening defined therein in alignment with said chute, an intermediate of said ply formed with a tongue above said defined opening and extending rearwardly thereof, said intermediate ply adhesively secured to said inner ply by the area thereof surrounding said tongue, said intermediate section having narrow portions struck out therefrom parallel to the sides of said tongue and to its end, the upper ply of said top wall having an outwardly diverging tongue struck out therefrom, said outwardly diverging tongue having its center section overlying said first tongue and adhesively secured thereto, said center section defined by fold lines defining triangular sections at each side thereof, said triangular sections unattached to said intermediate ply whereby said tongues may be simultaneously lifted to expose said discharge opening, and said triangular sections may be inwardly pressed and engaged in the struck out section to the sides of said first tongue to maintain said tongue portions in lifted position and provide an outlet nozzle for said discharge opening.

References Cited in the file of this patent

UNITED STATES PATENTS

| | | |
|---|---|---|
| 957,005 | Sherman | May 3, 1910 |
| 1,261,072 | Uyehara | Apr. 2, 1918 |
| 1,576,207 | Mummery | Mar. 9, 1926 |
| 1,931,270 | Rice | Oct. 17, 1933 |
| 1,983,707 | Rice | Dec. 11, 1934 |
| 2,692,708 | Frey | Oct. 26, 1954 |
| 2,738,906 | Frey | Mar. 20, 1956 |
| 2,747,776 | Hentschke et al. | May 29, 1956 |